United States Patent [19]

Schulz et al.

[11] Patent Number: 5,763,363
[45] Date of Patent: Jun. 9, 1998

[54] NANOCRYSTALLINE NI-BASED ALLOYS AND USE THEREOF FOR THE TRANSPORTATION AND STORAGE OF HYDROGEN

[75] Inventors: Robert Schulz, Sainte-Julie; John Strom-Olsen, Westmount; Leszek Zaluski, Montreal, all of Canada

[73] Assignee: Hydro-Quebec and McGill University, Montreal, Canada

[21] Appl. No.: 772,862

[22] Filed: Dec. 26, 1996

Related U.S. Application Data

[63] Continuation of Ser. No. 387,457, Feb. 13, 1995, abandoned.

[30] Foreign Application Priority Data

Mar. 7, 1994 [CA] Canada .................. 2117158

[51] Int. Cl.$^6$ .................. B01J 23/00; B01J 23/58
[52] U.S. Cl. .................. 502/335; 502/328; 75/300; 148/33.2; 148/336
[58] Field of Search .................. 502/328, 335; 75/300; 148/33.2, 336

[56] References Cited

U.S. PATENT DOCUMENTS 4,214,699  7/1980  Buchner et al. .
5,433,797  7/1995  Erb et al. .................. 148/304

FOREIGN PATENT DOCUMENTS 2 386 428  11/1978  France .
WO 94/12695  6/1994  WIPO .

OTHER PUBLICATIONS

Fecht et al. "Nanocrystalline Metals Prepared By High-Energy Ball Milling", Metallurgical Transactions A, vol. 21A, Sep. 1990, pp. 2333–2337.

Li et al., "A New Method For The Production of Mg-Ni Hydrogen Storage Materials", Advanced Materials, vol. 5, No. 7/8, 1993, pp. 554–555. no month available.

*Primary Examiner*—Elizabeth D. Wood
*Attorney, Agent, or Firm*—Foley & Lardner

[57] ABSTRACT

A powder of an alloy of Ni and Mg, La, Be or Li, consisting of crystallites having a grain size lower than 100 nm and a crystalline structure allowing hydrogen absorption. This powder which is preferably obtained by mechanical grinding, may consist of crystallites of $Mg_2Ni$, $LaNi_5$ or of Ni-based alloys of Be or Li having a grain size lower than 100 nm. The powder may also consist of crystallites of formula $Mg_{2-x}Ni_{1+x}$, x ranging from −0.3 to +0.3, which have a grain size lower than 100 nm, and preferably lower than 30 nm. This crystalline powder is particularly useful for storing and transporting hydrogen. Indeed, it has been discovered that such Ni-based nanocrystalline powder requires no or only one single activation treatment at low temperature to absorb hydrogen. It has also been discovered that the kinetic of absorption and diffusion of hydrogen within the powder is much faster. This can be explained by the presence of a large number of grain boundaries.

10 Claims, 3 Drawing Sheets

NANOCRYSTALLINE NI-BASED ALLOYS AND USE THEREOF FOR THE TRANSPORTATION AND STORAGE OF HYDROGEN

This application is a continuation of application Ser. No. 08/387,457, filed Feb. 13, 1995, and now abandoned.

BACKGROUND OF THE INVENTION a) Field of the Invention

The present invention relates to new Ni-based alloys hereinafter called "nanocrystalline alloys", which distinguish over the known alloys of the same composition in that they consist of crystallites having a grain size lower than 100 nm and a crystalline structure allowing hydrogen absorption.

The invention also relates to a process for preparing these new nanocrystalline alloys, and to their use for the transportation and/or storage of hydrogen.

b) Brief Description of the Prior Art

It is known that some metallic alloys are capable of absorbing hydrogen in the reversible manner. By way of examples of alloys that can form hydrides reversibly, reference can be made to FeTi, LaNi$_5$ and Mg$_2$Ni.

Thanks to their ability to absorb hydrogen, these alloys in a powder form are particularly useful for storing hydrogen. Indeed, they have the following advantages:

(1) a very large hydrogen storage capacity, which is even higher than the one of liquid hydrogen, because the volume density of hydrogen within these alloys is higher than the one of liquid hydrogen due to the formation of hydrogen-metal bonds that make it possible for the hydrogen atoms to be at a distance lower from each other than the distance at which these atoms are within liquid hydrogen;

(2) a complete reversibility of the mechanism of hydride formation;

(3) an endothermical release of the hydrogen from the alloys, which reduces to a maximum extend the safety problems; and (4) a non-requirement for an advanced technology to obtain hydrogen transfer to or from the alloys.

In spite of these advantages, the known alloys capable of absorbing hydrogen in a reversible manner have never been used on an industrial scale, because of the following difficulties.

(1) First of all, some alloys like Mg$_2$Ni are not easy to prepare inasmuch as the phase diagram of the metals that constitute the same does not allow direct preparation of the same by mere cooling of a molten mixture of their constituting metals;

(2) Secondly, these alloys are efficient for storing hydrogen only if they are in a crystalline form. Accordingly, one must first convert these alloys into a crystalline form if there are amorphous, and then activate the same. This calls for annealing the alloys at hight temperature under vacuum and/or a high hydrogen pressure, several times in order to obtain the requested reproducible absorption/desorption characteristics.

(3) Moreover, during the absorption/desorption cycle, the known crystalline alloys usually fragment into small particles and loose their structural integrity. This results in a deterioration of the hydrogen absorption kinetic and in a heat transfer problem.

(4) Last of all, because of oxides that are formed on their surface when they are in contact with ambient air, the known alloys, even when they are in a crystalline form, must be activated in order to absorb hydrogen. The activation treatment consists in heating several times at high temperature the alloys under a high pressure of hydrogen. This treatment must be repeated every time the alloy is exposed to air.

During a research program carried out over the last three years on the FeTi alloy and on its ability to reversibly absorb hydrogen, the present inventors have discovered that, if a powder of FeTi or a mixture of powders of Fe and Ti in preselected amounts are intensely ground for several hours under an inert atmosphere, a crystalline powder of FeTi can be obtained directly, which is made of particles having a grain size lower than 100 nm.

The present inventors have also discovered that this nanocrystalline powder of FeTi is useful as an absorbing medium for storing hydrogen without requiring an activation treatment, contrary to the conventional polycrystalline powders of FeTi.

Continuing their research, the present inventors have now discovered in a very surprising manner that it is possible to obtain others of Ni-based alloys directly in a nanocrystalline form, including, in particular, Mg$_2$Ni and LaNi$_5$ alloys that are known to absorb hydrogen, if one proceeds to an intense grinding of a powder of such alloys or of a suitable mixture of powders of the metals forming these alloys for several hours.

This is a priori very surprising inasmuch as, on the one hand, the synthesis of any alloy or intermetallic compound by grinding is not always possible and, on the other hand, such a synthesis, when possible, often leads to an alloy that is in an amorphous state rather than in a crystalline form.

It has also been discovered that if such a grinding is carried out in such a manner as to reduce the size of the particles to a few nanometers, the nanocrystalline powder Mg$_2$Ni, LaNi$_5$ or any other nickel-based alloy having a crystalline structure capable of absorbing hydrogen, can subsequently be used as an absorbing medium for storing hydrogen in the forms of hydrides, without requiring any activation treatment.

OBJECTS AND SUMMARY OF THE INVENTION

Therefore, a first object of the present invention is to provide a nanocrystalline powder of an alloy of Ni with another metal selected from the group consisting of Mg, La, Be and Li, wherein this powder consists of crystallites having a grain size lower than 100 nm and a crystalline structure allowing hydrogen absorption.

This powder may consist of crystallites of LaNi$_5$ having a grain size lower than 100 nm, or of crystallites of alloys of Ni with Be or Li having a grain size lower than 100 nm and a crystalline structure allowing hydrogen absorption.

According to a particularly preferred embodiment of the invention, which forms another object of the present invention, the powder preferably consists of crystallites of the formula Mg$_{2-x}$Ni$_{1+x}$, x ranging from −0.3 and +0.3, wherein these crystallites have a grain size lower than 100 nm and preferably lower than 30 nm.

A further object of the present invention is to provide a method for storing and/or transporting hydrogen, consisting in reversibly absorbing hydrogen in a nanocrystalline powder like those that have just been disclosed. Indeed, it has been discovered that these Ni-based nanocrystalline powders, like those of FeTi, require either no or only one simple activation treatment at low temperature. It has also been discovered that the kinetic of absorption and diffusion of hydrogen within said alloys is much faster. This can be explained by the fact that the nanocrystalline powder has a very great number of grain boundaries.

Still another object of the invention is to provide a process for preparing the nanocrystalline powders mentioned thereinabove, which comprises the steps of intensely grinding a powder of this alloy until the grain size of the crystallites reaches requested value, or of intensely grinding a mixture of a powder of Ni with a powder of the other metal in such amounts so as to obtain the requested alloy, said grinding allowing the preparation in a mechanical way of the crystallites of the requested alloy from the powders of Ni and of the other metal, and simultaneously allowing the reduction of the grain size of these crystallites to the requested value. This process is particularly advantageously in that it is very simple and can be carried out at ambient temperature under atmospheric pressure. However, it is necessary that the grinding step be carried out under an inert atmosphere in order to avoid oxidation of the alloy that is being formed.

According to a preferred embodiment of the invention, at least one additional metal can be added to Ni and the other metal at the beginning of the grinding steps. This additional metal must be selected so as not to modify the crystalline structure of the intermetallic alloy that will be obtained. This additional metal can be aluminum, cobalt, lanthanum, palladium or preferably copper.

According to another preferred embodiment of the invention, once the grinding step is completed and the requested crystallites particles are obtained, a given amount of a hydrogen dissociation catalyst material can be added to the particles and the resulting mixture can be subjected to an additional grinding step shorter in time that the first grinding step so as to apply clusters of the catalyst material onto the crystalline particles. The catalyst material can be palladium, platinum, iridium or rhodium. Preferably, this catalyst material is palladium.

The invention and its numerous advantages will be better understood upon reading the following, more detailed but non restrictive description that follows, made with reference to the accompanying drawings:

DETAILED DESCRIPTION OF THE INVENTION

As previously indicated, the present invention relates to powders of an alloy of Ni with another metal selected amongst Mg, La, Be and Li, which consist of crystallites having a grain size lower than 100 nm and a crystalline structure allowing hydrogen absorption.

In accordance with the invention, it is compulsory that this powder be in a crystalline form. Indeed, it is known and has already been confirmed by tests carried out by the inventors, that the very same alloys in an amorphous state are not efficient for storing hydrogen.

Figure 1:
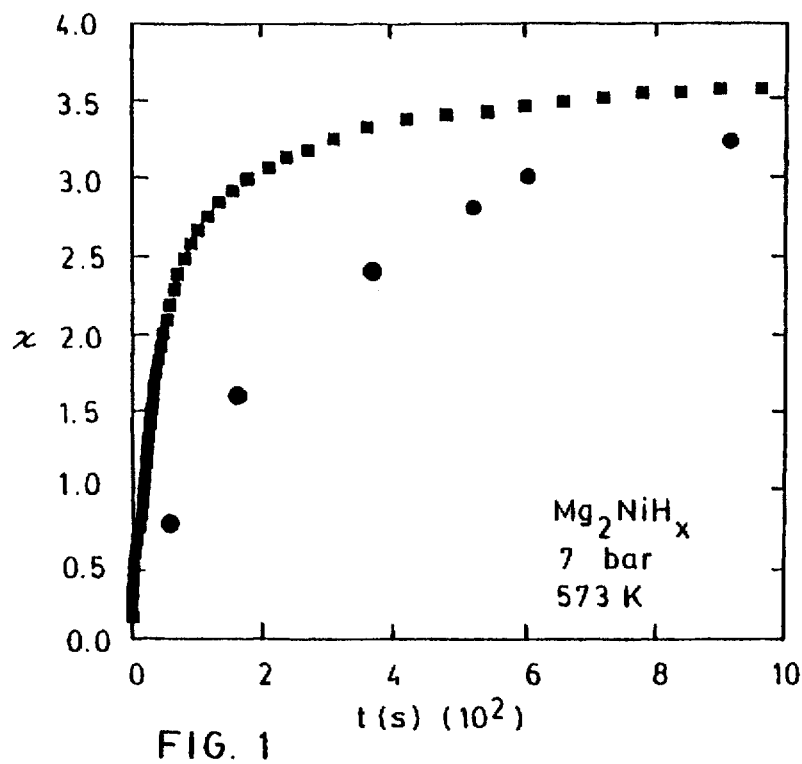
FIG. 1 is a curve giving the hydrogen absorption rate, (expressed in number exhausts hydrogen atom absorbed in the form of $Mg_2NiH_x$ as a function of the time) at 573° K. under a pressure of 7 bars during a second hydrogenation of a nanocrystalline alloy of $Mg_2Ni$(■) and during the hydrogenation of a polycrystalline alloy of $Mg_2Ni$ after an activation process of 10 cycles (●).
Figure 2:
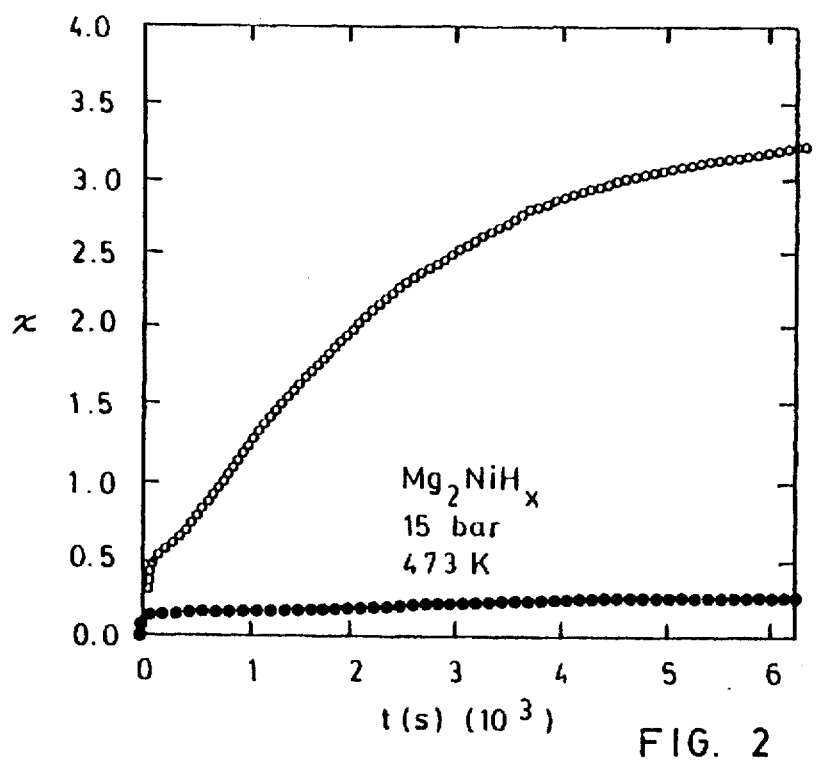
FIG. 2 is a graphite similar to one of FIG. 1, giving the hydrogen absorption rate at 473° K. under a pressure of 15 bars for a nanocrystalline alloy $Mg_2Ni$(○) and a polycrystalline alloy of formula $Mg_2Ni$(●).

In accordance with the invention, it is also compulsory that, alloy powder has particles of a grain size lower than 100 nm. In the very particular case of the alloy of formula $Mg_{2-x}Ni_{1+x}$ the particle grain size is preferably lower than 30 nm. To appreciate the importance of this particular requirement, one may refer to FIG. 1 which shows that a nanocrystalline alloy of formula $Mg_2Ni$ according to the invention, consisting of crystalline particles (viz. crystallites) having a size ranging from 20 to 30 nm, absorbs hydrogen much faster than a similar polycrystalline alloy eventhough this polycrystalline has been extensively activated. One may also refer to FIG. 2 which shows that a polycrystalline alloy of formula $Mg_2Ni$ when it is not activated, absorbs almost no hydrogen, as compared to the nanocrystalline alloy of formula $Mg_2Ni$ according to the invention.

These two figures clearly show that the alloys according to the invention are not only more efficient for absorbing hydrogen than the similar polycrystalline alloys, but also that they do not require any activation like those that are presently required to eliminate the external layer of oxides which reduce the absorption kinetic of the alloy.

This can tentatively be explained by the very small size of the crystallites and the chemical non-homogeneity of the surface of these particless. Because of their grain size lower than 100 nm, the particles contain, on the surface, small clusters of pure Ni with other small clusters of oxides, such as MgO in the case of the alloy of formula $Mg_2Ni$. These small clusters of pure Ni facilitate the dissociation of hydrogen absorbed on the surface of the crystalline particles and, thereby, the absorption of the hydrogen atoms within the crystalline structure of the alloy. This efficiency can also be explained by the presence of a great number of grain boundaries and of surface defects which allow hydrogen to penetrate within the structure in spite of the presence of a passivating layer.

In accordance with the invention, it is further essential that the powder has a crystalline structure allowing hydrogen absorption, this property being the main utility that is wanted for the alloy in the scope of the present invention.

An alloy which has supposed to be particularly efficient for this purpose is the one of formula $Mg_{2-x}Ni_{1+x}$ (x ranging from −0.3 and 0.3 and being preferably equal to 0), which is in a complex hexagonal crystalline structure (18 atoms per each cell). Another alloy that is particularly useful according to the invention is the one of formula $LaNi_5$.

The following table shows the absorption capacity and, thereby, the hydrogen storing capacity of different alloys.

| kind of storing | density of material (g/l) | volume density (number of hydrogen atoms per ml × $10^{-22}$) | mass density (% weight $H_2$) |
| --- | --- | --- | --- |
| gaseous hydrogen at 200 atm | 1.64 *$10^{-4}$ | 0.98 | 100 |
| liquid hydrogen | 0.071 | 4.2 | 100 |
| $FeTiH_{1.93}$ | 5.47 | 6.0 | 1.8 |
| $LaNi_5H_{6.7}$ | 8.25 | 7.58 | 1.5 |
| $Mg_2NiH_4$ | 2.6 | 5.9 | 3.8 |
| carbon | 0.32 | 0.7 | 4 |

It is worth mentioning that the hydrides in powder form listed in the above table may contain a given amount of voids that may be as high as 50%. In such a case, the volume density will be reduced. It is also worth mentioning that the mass density does not take into account the weight of the container. If this weight is taken into account, the absorption capacity per mass unit of $Mg_2NiH_4$ would be similar to the one of a liquid hydrogen.

As can now be appreciated, the capacity of absorption and, therefore, of hydrogen storing of the alloy of formula $Mg_2Ni$ is substantially identical to the one of the alloy of formula FeTi. It is also much higher than the one of gaseous or liquid hydrogen (see the values of the volume density). In practice, this means that one can store more hydrogen by absorbing the same in a given volume of alloy than in storing it in gaseous or liquid state.

As can also be appreciated, the alloy of formula $Mg_2Ni$ is more interesting from a practical standpoint than the alloy of formula FeTi, inasmuch as its density and, therefore, its weight per unit volume are much lower.

The alloy of formula $LaNi_5$ is also interesting in that its capacity of storing hydrogen is much higher than those of the alloys of formula FeTi and $Mg_2Ni$. However, the volume density of this alloy is very high, thereby making it less convenient in use.

In accordance with the invention, other Ni-based alloys capable of absorbing hydrogen are also provided, wherein the other element of the alloy is a very light metal, such as lithium or beryllium. The use of such lighter elements has the main advantage of reducing the volume density of the alloy and make it more interesting from a practical standpoint. Therefore, the invention is also directed to nanocrystalline alloys of Ni and Li or Be, which are capable of absorbing hydrogen.

The nanocrystalline alloys according to the invention can be prepared directly from the corresponding polycrystalline alloys. This can be achieved by intensely grinding the polycrystalline alloys to reduce the grain size of the particles to the required value.

According to a particularly preferred embodiment of the invention, the nanocrystalline alloys according to the invention can also be prepared directly from powders of the metals that form the alloy. This direct preparation can be carried out in a very simple manner, by merely grinding at ambient temperature under an inert atmosphere, a mixture of a powder of Ni with a powder of the other metal of the alloy, in amounts selected to obtain the requested composition. To be efficient, this grinding must be carried out under high energy. It allows the preparation by mechanical alloying of the alloy from powders of Ni and of the other metal and at the same time reduces the crystal size to the requested value.

From a practical standpoint, this intense grinding can be carried out with a high energy ball milling machine. By way of examples of such ball milling machines, reference can be made to those sold under the trademarks SPEC 8000 or FRITCH.

In accordance with the invention, it has been discovered that such an intense grinding of powders of metal carried out under an inert atmosphere (like argon) causes the metals to react while the powders are ground, and leads to the formation of the requested crystalline alloy particles.

From a practical standpoint, this is particularly interesting since this allows for the direct synthesis of alloys, like for example $Mg_2Ni$, that are usually very difficult to obtain by melting and cooling.

The fact that an intermetallic compound like $Mg_2Ni$ can be directly prepared in a crystalline form by mechanical alloying was not obvious at all before the present invention was actually made. Indeed, in numerous cases, such a grinding leads to a mixture of several compounds or to an amorphous alloy. Moreover, there was no indication that an alloy like $Mg_2Ni$ having a very complex hexagonal crystalline structure (18 atoms per cell), could be prepared by mechanical alloying like it was for the case of FeTi which has a much simpler centered cubic structure.

Figure 3:
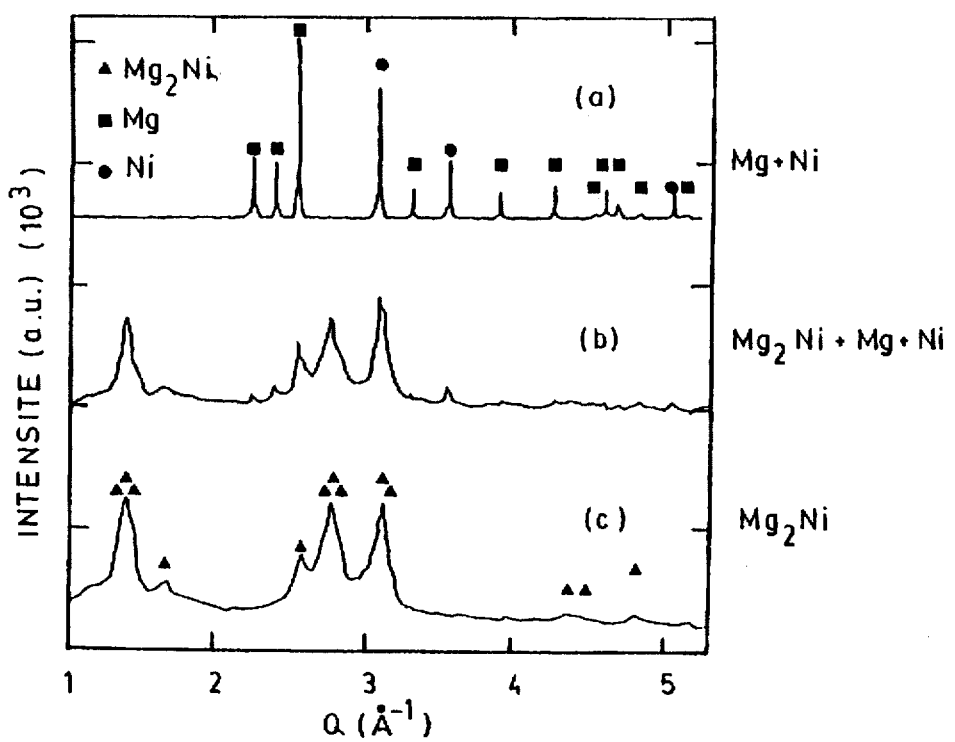
FIG. 3 is an illustration of the X ray diffraction spectra of a mixture of Mg-Ni(a) in the initial state (i.e. a mixture of pure powders of Mg and Ni before grinding), (b) after 26 hours of grinding and (c) 66 hours of grinding.

In practice, such grinding can be carried out for several hours. FIG. 3 shows the way the alloy of formula $Mg_2Ni$ is synthesized, by comparing X ray diffraction spectra of the same while it is being formed. At the beginning of the grinding [see spectrum (a)], each metal has its own diffraction peaks (■ for Mg and ● for Ni). After 26 hours of grinding [see spectrum (b)], the peaks of the pure metals are almost eliminated whereas those of the alloys appear. After 66 hours of grinding [see spectrum (c)] only the peaks of the alloy of formula $Mg_2Ni$ are visible (▲). This clearly shows that the alloy is actually formed by mechanical grinding. In this case, the grains that were obtained had a size of 20 to 30 nm.

This process of preparation of the alloy by mere grinding has numerous advantages:

1. it is simple, non expensive and versatile;
2. it can easily be scaled up;
3. it can be used for preparing alloys that are difficult to prepare in a conventional way (like $Mg_2Ni$);
4. the characteristics of the alloy as a hydrogen absorbing material (temperature and pression of absorption of hydrogen) can easily be modified by changing the composition of the mixture to be ground; and
5. a catalytic material like Pd can easily be applied to the powder by a subsequent grinding.

In accordance with the invention, this process of preparation can be applied to any conventional hydrogen absorbing alloy (FeTi, $Mg_2Ni$, $LaNi_5$, . . . ) to increase its properties. This process can also be used for preparing new lighter Ni-based alloys (like, for example, Be or Li-containing alloy).

As previously indicated, the nanocrystalline alloys according to the invention are essentially intended to be used for storing and transporting hydrogen in order to subsequently use it as a combustible.

As is know, there is presently a need for means for storing and transporting hydrogen especially as the use of hydrogen as a combustible is increasing. For example, during a recent car exhibition, the Japanese car manufacturer MAZDA advertised a hydrogen-operated car. Accordingly, there is presently a real need in this field, not only in the car industry but for numerous other applications.

The only methods of storing and transporting hydrogen that are presently used on a large scale, are:

in a gaseous state in pressurized cylinders; or in a liquid state in cryogenic containers.

Transportation of hydrogen in the liquid state is not convenient because of the refrigeration cost that is high and the safety hazard in the case of a failure of the refrigeration system. Transportation in the gaseous state has a drawback of being not very efficient, because of the low density of hydrogen per volume unit.

It has already been suggested to store and transport hydrogen in a solid state, that is in the form of hydrides of crystalline alloys such as FeTi, $Mg_2Ni$ or $LaNi_5$. The storing and transportation of hydrogen in the form of hydrides has important advantages in that it does not call for any cooling system, and one can store up to 6 times more hydrogen per volume unit than i the gaseous state. The number of hydrogen atoms per volume unit in hydrides is superior to that of liquid hydrogen and, in addition, there is no need for expensive cooling systems (see the table given hereinabove, in which the different methods of storing and transporting hydrogen given are compared). The main problems with hydrides have been:

the problem of weight (the alloys of FeTi and $LaNi_5$ are very heavy);

the slow absorption—desorption kinetics;

the necessity of activating the alloy particles on a regular basis to make them absorbing.

These factors have severely limited their use so far.

In accordance with the present invention, it has been discovered ghat if use is made of a nanocrystalline powder of an alloy capable of absorbing hydrogen, such as $Mg_2Ni$ (which has the additional advantage of being also very light as compared to FeTi), it is not necessary to activate the so powder to make it absorbing. At worst, a single activation treatment at low temperature is sufficient. Moreover, it has been discovered that the kinetic of absorption (diffusion of hydrogen within the alloy) are much faster since the nanocrystalline alloy has a very large number of grain boundaries. It has further been discovered that the nanocrystalline alloys according to the invention keep their structural integrity when they are subjected to absorption-desorption cycles, since the size of the crystallites is already lower than the typical size of grains after hydrogen decrepitation.

Therefore, the nanocrystalline alloys according to the invention are particularly useful and efficient for storing and/or transporting hydrogen. As a matter of fact, these alloys have the following advantages as compared to the corresponding polycrystalline alloys:

they are capable of absorbing hydrogen at temperatures lower than 200° C. without any activation (by way of comparison, the conventional crystalline magnesium-nickel alloys react with hydrogen only at temperatures higher than 250° C. and after several activation cycles);

their activation is much easier to carry out (with the conventional $Mg_2Ni$ alloys, it is necessary to initiate hydrogen absorption at temperatures higher than 300° C., usually after several cycles at high temperatures under high pressure);

their kinetics of hydrogen absorption is much faster than the one of corresponding polycrystalline alloys; and they are less subject to decrepitation (they have a better structural integrity).

In order to further improve the quality and efficiency of the nanocrystalline alloys according to the invention, a material capable of catalysing the dissociation of the hydrogen molecule, such as, for example, palladium, can be applied onto the surface of the crystalline particles. This material can be applied in a very simple manner, by grinding for a much shorter period of time the ore-synthesized nanocrystalline particles with a powder of the catalyst material. Thus, one can grind the nanocrystalline alloy particles with a powder of Pd for a given period of time. This subsequent grinding causes clusters of palladium to be deposited onto the surface of the crystalline particles. It is however compulsory that this supplemental grinding be not too long, since, otherwise, a new intermetallic alloy may be formed.

Figure 4:
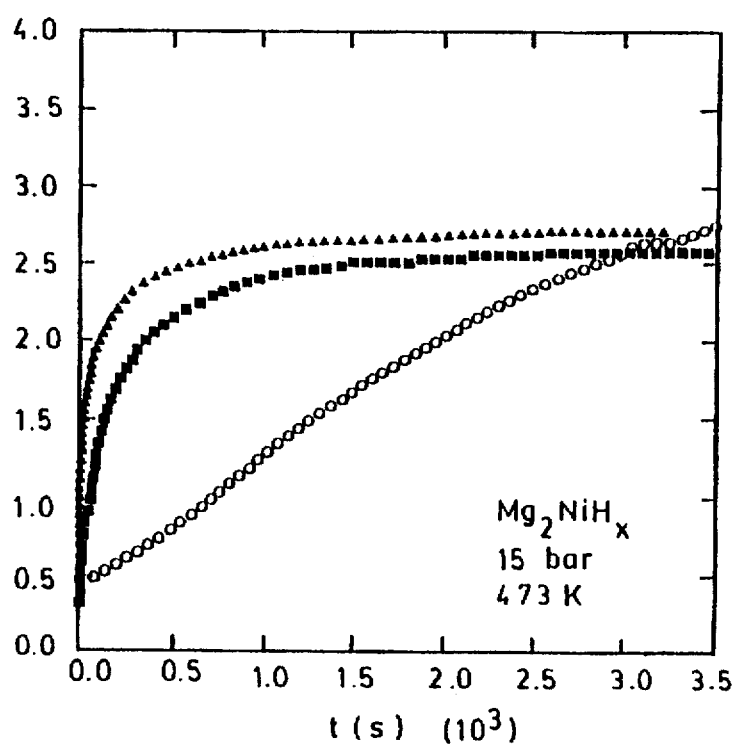
FIG. 4 is a curve giving the hydrogen absorption rate at 473° K. under a pressure of 15 bars but a nanocrystalline alloy of formula $Mg_2Ni$ (○) and of a very same alloy after an additional grinding of said alloy with Pd (▲, ■).

The advantages of such a deposition of a catalyst onto the surface of the nanocrystalline alloy according to the invention are illustrated in FIG. 4, which shows that when palladium (see curves ▲, ■) is applied onto nanocrystalline particles of formula $Mg_2Ni$, the absorption at the same temperature and pressure is much faster than with the very same alloy without catalyst.

Figure 5:
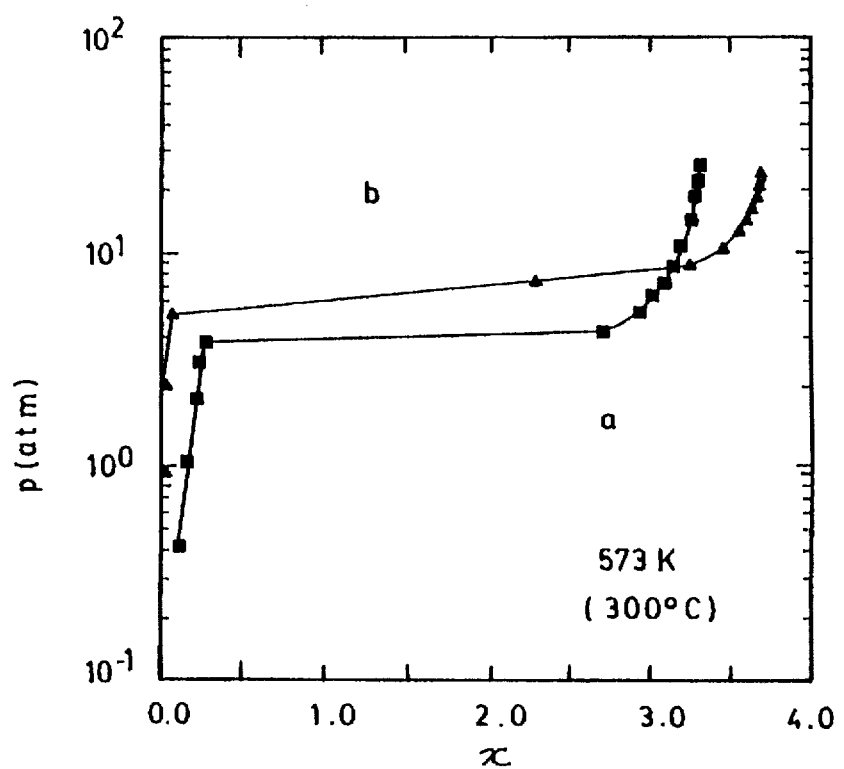
FIG. 5 are isothermic curves giving the pression/concentration of hydrogen at 573° K. during the absorption (a) of hydrogen by (a) a nanocrystalline alloy of formula $Mg_2Ni$ and (b) a nanocrystalline intermetallic alloy of formula $Mg_2Ni_{0.75}Cu_{0.25}$.

In the previous description, reference has been made exclusively to bi-metal alloys. The present invention also covers intermetallic alloys formed with the same metals as above, but also including one or more additional metals, the presence of which does to affect the crystalline structure. These other metals can be selected from he group consisting of Al, Co, Fe, Ia, Zn, Pd and, preferably, Cu. Such an addition of another metal is interesting since it can be made with the very same process of preparation (i.e. by adding a suitable amount of a powder of the other metal to the powders of the metals forming the basic alloy). Moreover, such an addition is interesting inasmuch as it permits to modify and thus to adjust the absorption characteristics of a given alloy. In this connection, reference can be made to FIG. 5, which shows a substantial variation in the position of the plateau of the isothermic pressure/absorbed hydrogen concentration curve in the case of a nanocrystalline alloy of formula $Mg_2Ni$ (■) and a nanocrystalline alloy of formula $MgNi_{0.75}Cu_{0.25}$.

In order to prove the efficiency of the nanocrystalline alloys according to the invention for storing hydrogen, several tests were carried out. During these tests, the absorption kinetics and the amount of hydrogen absorbed by a nanocrystalline powder of formula $Mg_2Ni$ were measured by using an automated volumetric apparatus controlled by a computer. The powder was placed in a stainless steel reaction chamber connected to a gas feeding system and pressure gauges. The amount of absorbed hydrogen is calculated from the change of pressure between the reaction chamber and a fixed pressure reservoir.

EXAMPLE 1

Nanocrystalline $Mg_2Ni$ powder fabricated by ball-milling was evacuated and heated to the desired temperature of hydrogenation i.e. 300° C. Hydrogen was then admitted at 12 bars, and the material was hydrogenated for 40 min. (first hydrogenation cycle) and for 5 min. (subsequent cycles). The amount of the absorbed hydrogen was found to be 3.35 wt %, which his in the range of the amount of hydrogen normally absorbed by conventional polycrystalline $Mg_2Ni$. However, nanocrystalline, ball-milled material did not need to be activated prior to hydrogenation and was characterized by much faster absorption of hydrogen. Dehydrogenation was done at the same temperature (300° C.) at hydrogen pressure of 1 bar for 10 min.

EXAMPLE 2

Nanocrystalline $Mg_2Ni$ powder, fabricated by ball-milling, was evacuated and heated to the hydrogenation temperature i.e. 200° C. Then, hydrogen was admitted at 15 bars and hydrogenation was done for 60 min. The amount of absorbed hydrogen was 2.55 wt %.

EXAMPLE 3

Nanocrystalline powder of $Mg_2Ni$ fabricated by ball-milling with palladium was evacuated and heated to the desired temperature of hydrogenation (200° C.). Then, hydrogen was introduced at 15 bars, and the material was hydrogenated for 10 min. at 200° C. The amount of hydrogen absorbed by the material at 200° C. (with no previous activation applied) was about 2.4 wt % which is 68% of the stoichiometric compound $Mg_2NiH_4$ and this value can reach 72% is hydrogenation is performed at 300° C. or above. In the case of desorption, hydrogen was vented and dehydrogenation took place at the hydrogen pressure of 0.3 bar for 1 h.

EXAMPLE 4

Nanocrystalline $Mg_2$ fabricated by ball-milling with the surface of the powder modified by palladium, was evacuated for 5 to 15 min. at room temperature. Then, hydrogen was introduced at 12 bars and the material was hydrogenated for 17 m in. at room temperature. The amount of absorbed hydrogen was 2 wt %. For dehydrogenation which took about 1 h, the material was heated up to 200° C. and hydrogen pressure was decreased to 0.3 bar.

We claim:

1. A method for storing and/or transporting hydrogen, comprising reversibly absorbing hydrogen in the gas phase in a nanocrystalline powder alloy of the formula $Mg_{2-x}Ni_{1+x}$, wherein x ranges between −0.3 and +0.3, and wherein said powder comprises crystallites having a grain size less than 100 mn.

2. A method for storing and/or transporting hydrogen, comprising reversibly absorbing hydrogen in the gas phase in a nanocrystalline powder alloy of the formula $Mg_{2-x}Ni_{1+x}$, wherein x ranges between −0.3 and +0.3, and wherein said powder comprises crystallites having a grain size less than 100 mn and is obtained by grinding a Mg powder with a Ni powder under an inert atmosphere, in such amounts so as to obtain said alloy, said grinding allowing the preparation in a mechanical way of said crystallites of $Mg_{2-x}Ni_{1+x}$ from said Mg and Ni powders, and simultaneously reducing the grain size to less than 100 nm.

3. A method of storing and/or transporting hydrogen, comprising reversibly absorbing hydrogen in the gas phase in a nanocrystalline powder of an alloy of Ni, with another metal selected from the group consisting of Mg, La, Be and Li, wherein said powder comprises crystallites having a grain size lower than 100 nm and a crystalline structure which provides for hydrogen absorption.

4. A method of storing and/or transporting hydrogen, comprising reversibly absorbing hydrogen in the gas phase in a nanocrystalline powder of an alloy of Ni, with another metal selected from the group consisting of Mg, La, Be and Li, wherein said powder alloy comprises crystallites having a grain size less than 100 nm and a crystalline structure which provides for hydrogen absorption, wherein said powder alloy is obtained by grinding a Ni powder with a powder of the other metal under an inert atmosphere in such amounts so as to obtain said alloy, said grinding allowing the preparation in a mechanical way of said crystallites of said alloy from said powders of Ni and of the other metal, and simultaneously reducing the grain size to less than 100 nm.

5. A method for storing and/or transporting hydrogen as claimed in claim 2, wherein the crystallites of said nanocrystalline powder are covered with clusters of a hydrogen dissociation catalyst selected from the group consisting of Pd, Pt, Ir and Rh.

6. A method for storing and/or transporting hydrogen as claimed in claim 5, wherein the grain size of the crystallites of said nanocrystalline powder is less than 30 nm.

7. A method for storing and/or transporting hydrogen as claimed in claim 1, wherein said powder consists of said crystallites.

8. A method for storing and/or transporting hydrogen as claimed in claim 2, wherein said powder consists of said crystallites.

9. A method for storing and/or transporting hydrogen as claimed in claim 3, wherein said powder consists of said crystallites.

10. A method for storing and/or transporting hydrogen as claimed in claim 4, wherein said powder consists of said crystallites.

* * * * *

UNITED STATES PATENT AND TRADEMARK OFFICE
CERTIFICATE OF CORRECTION

PATENT NO. : 5,763,363
DATED : June 9, 1998
INVENTOR(S) : Robert SCHULZ, et al.

Page 1 of 2

It is certified that error appears in the above-identified patent and that said Letters Patent is hereby corrected as shown below:

Column 3, line 53: delete " graphite " insert -- graph -- ;

Column 6, line 2: delete " SPEC " insert -- SPEX --;

Column 7, line 14: delete " i " insert -- in --;

line 29: delete " ghat " insert -- that --;

line 63: delete " . " insert -- , --;

line 65: delete " molecule. " insert -- molecule, --;

UNITED STATES PATENT AND TRADEMARK OFFICE
CERTIFICATE OF CORRECTION

PATENT NO. : 5,763,363
DATED : June 9, 1998
INVENTOR(S) : Robert SCHULZ, et al.

It is certified that error appears in the above-identified patent and that said Letters Patent is hereby corrected as shown below:

line 65: delete " as. " insert -- as, --;

line 67: delete " . " insert -- , --;

Column 8,   line 23: delete " Ia " insert -- La --;

Column 9,   line 20: delete " $Mg_2$ " insert -- $Mg_2Ni$ --.

Signed and Sealed this

Seventeenth Day of April, 2001

Attest:

NICHOLAS P. GODICI

*Attesting Officer*     Acting Director of the United States Patent and Trademark Office